(12) United States Patent
Veness et al.

(10) Patent No.: US 8,485,131 B2
(45) Date of Patent: Jul. 16, 2013

(54) AIR CIRCULATING LITTER BOX

(75) Inventors: David R. Veness, Fort Worth, TX (US); Mark C. Kitchens, Athens, TX (US); Regis M. Wandres, Athens, TX (US)

(73) Assignee: Doskocil Manufacturing Company, Inc., Arlington, TX (US)

( * ) Notice: Subject to any disclaimer, the term of this patent is extended or adjusted under 35 U.S.C. 154(b) by 0 days.

(21) Appl. No.: 13/227,320

(22) Filed: Sep. 7, 2011

(65) Prior Publication Data

US 2012/0137980 A1    Jun. 7, 2012

Related U.S. Application Data

(60) Provisional application No. 61/380,667, filed on Sep. 7, 2010.

(51) Int. Cl.
*A01K 29/00* (2006.01)
(52) U.S. Cl.
USPC .......................... 119/165; 119/493; 119/500
(58) Field of Classification Search
USPC ................ 119/165, 161, 162, 163, 419, 493, 119/500, 418; 454/243, 244, 245
See application file for complete search history.

(56) References Cited

U.S. PATENT DOCUMENTS

| | | | | |
|---|---|---|---|---|
| 4,522,150 A * | 6/1985 | Gershman | ...... | 119/165 |
| 5,134,972 A * | 8/1992 | Compagnucci | ...... | 119/165 |
| 5,178,099 A * | 1/1993 | Lapps et al. | ...... | 119/166 |
| 5,307,761 A * | 5/1994 | Berger et al. | ...... | 119/165 |
| 5,564,364 A * | 10/1996 | Kovacs et al. | ...... | 119/163 |
| 5,655,478 A * | 8/1997 | Kiera | ...... | 119/165 |
| 5,778,822 A * | 7/1998 | Giffin et al. | ...... | 119/165 |
| 6,123,048 A * | 9/2000 | Alkire et al. | ...... | 119/500 |
| 6,135,057 A * | 10/2000 | Cummings | ...... | 119/165 |
| 6,298,808 B1 * | 10/2001 | Crafton et al. | ...... | 119/165 |
| 6,341,579 B1 * | 1/2002 | Alkire et al. | ...... | 119/165 |
| 6,892,670 B2 * | 5/2005 | Northrop et al. | ...... | 119/166 |
| 6,945,193 B1 * | 9/2005 | Tanner et al. | ...... | 119/165 |
| 7,490,578 B1 * | 2/2009 | Mottard | ...... | 119/161 |

* cited by examiner

*Primary Examiner* — Yvonne Abbott
(74) *Attorney, Agent, or Firm* — Eckert Seamans Cherin & Mellott, LLC; Brij K. Agarwal (57) ABSTRACT

One embodiment may take the form of a litter box having a base portion having a floor and a plurality of walls extending in an upward direction from the floor. The litter box may also have a cover portion having a ceiling and a plurality of walls extending in a downward direction from the ceiling. The base portion and the cover portion may combine to define an inner cavity. The litter box may also include a circulating filter in communication with the inner cavity of the litter box and the circulating filter may be configured to filter air from within the inner cavity of the litter box.

12 Claims, 10 Drawing Sheets

AIR CIRCULATING LITTER BOX

CROSS-REFERENCE TO RELATED APPLICATIONS

This application is related to and claims priority to U.S. Provisional Patent Application Ser. No. 61/380,667, entitled "Air Circulating Litter Box," filed Sep. 7, 2010, which is incorporated herein by reference in its entirety and for all purposes.

TECHNICAL FIELD

Embodiments described herein relate to an animal litter box, and more particularly, to an animal litter box that circulates and filters air.

BACKGROUND

The use of filters in covered animal litter boxes has become increasingly popular. The cover conceals the animal waste and soiled litter from view and affords the animal privacy while using the litter box. The filter is typically replaceable and serves to absorb and/or neutralize litter box odors. When the filter loses its capacity to absorb odors, the pet owner generally removes and replaces the filter. However, some filters may only freshen and filter the air near the filter and thus, despite the filter, the litter box may still have stale and/or odor-filled air.

SUMMARY

One embodiment may take the form of a litter box having a base portion having a floor and a plurality of walls extending in an upward direction from the floor. The litter box may also have a cover portion having a ceiling and a plurality of walls extending in a downward direction from the ceiling. The base portion and the cover portion may combine to define an inner cavity. The litter box may also include a circulating filter in communication with the inner cavity of the litter box and the circulating filter may be configured to filter air from within the inner cavity of the litter box.

These and other objects and advantages of the disclosed embodiments will become readily apparent from the following detailed description taken in conjunction with the accompanying drawings.

DETAILED DESCRIPTION

Embodiments disclosed herein may include a litter box having a base portion and a cover portion. The base portion may have a floor and a plurality of walls extending in an upward direction from the floor. The cover portion may have a ceiling and a plurality of walls extending in a downward direction from the ceiling. The litter box may further have a circulating filter. The circulating filter may be configured to circulate air within the litter box, and may define one or more vents communicating between the circulating filter and the inner cavity of the litter box. One of the cover portion and the base portion may be configured to receive the circulating filter.

The circulating filter may be configured to sense when an animal has entered and exited the litter box, or in other embodiments the circulating filter may be configured be operated manually by a user. After the animal exits (or the circulating filter is otherwise activated) the circulating filter may pull air from within the litter box through or across a filter. The filter may include a single filter or multiple filters. In one embodiment, the circulating filter pulls air through a first filter and then forces the air through a second filter and back into the litter box. Thus, the air in the litter box may be re-circulated and filtered. The circulating filter may include an activation mechanism, a motor, at least one filter, and a fan. The fan pulls air from the litter box and passes the air through the filter(s), cleaning and deodorizing the air. The fan and/or filter(s) may be activated in response from a signal from the activation mechanism. In some embodiments, the activation mechanism may automatically operate the circulating filter and in other embodiments the activation mechanism may be manually operated via user control buttons, allowing a user to deodorize and circulate the air within the litter box whenever he or she may desire.

Figure 1A:
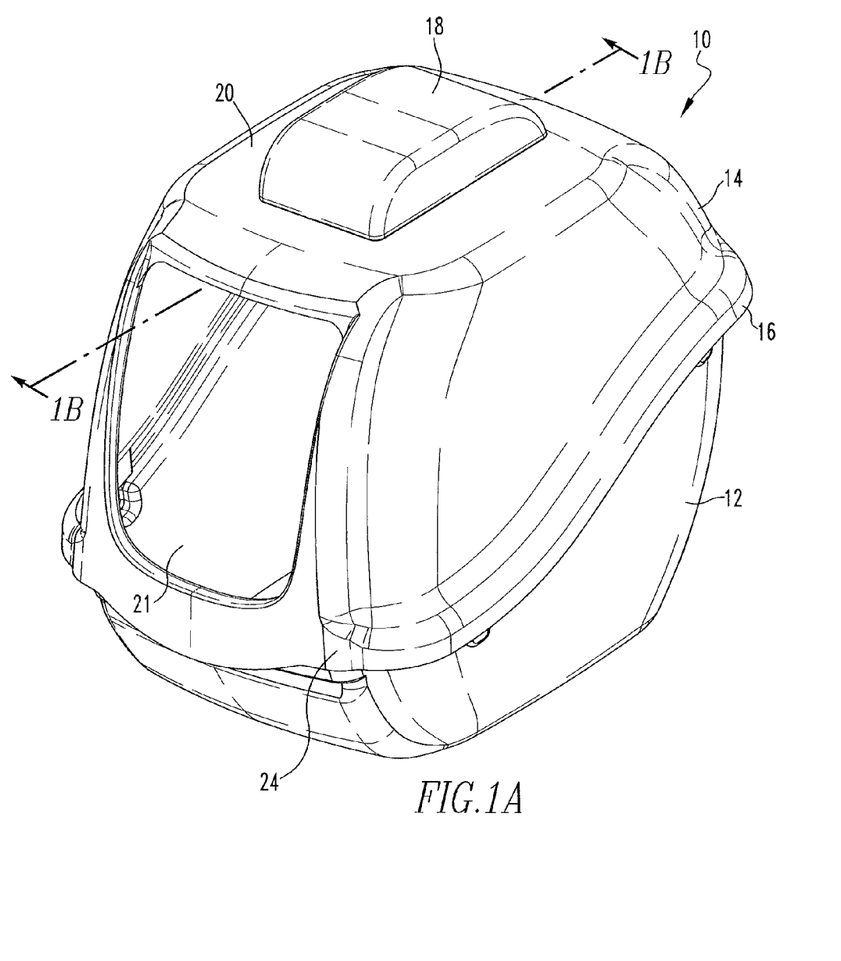
FIG. 1A illustrates a front isometric view of a covered animal litter box employing a circulating filter.
Figure 1B:
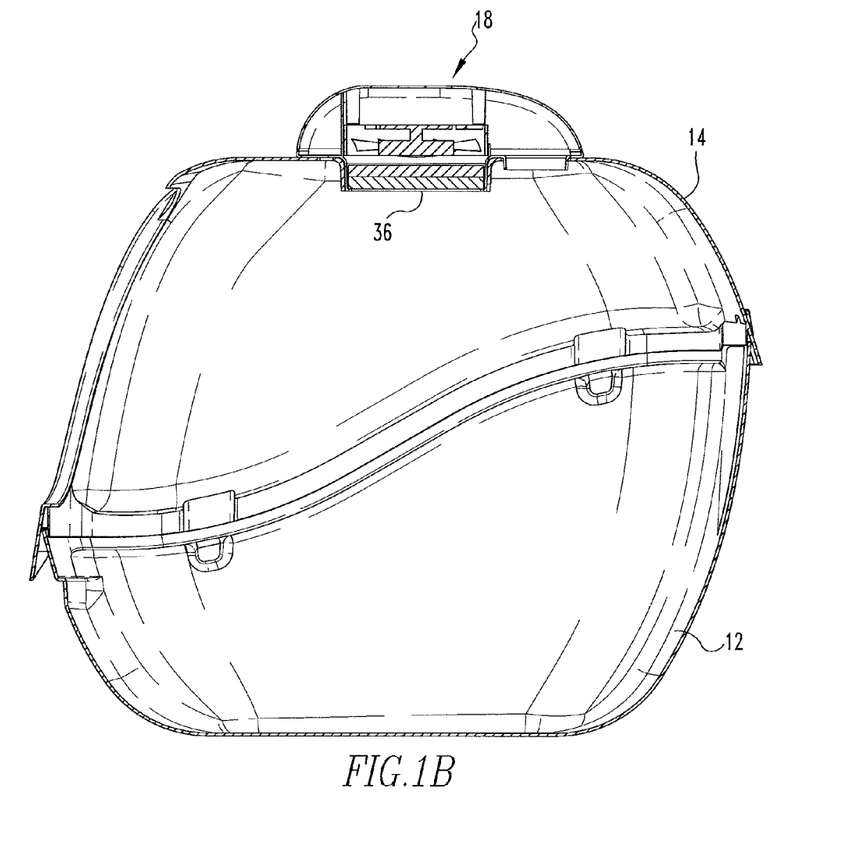
FIG. 1B illustrates a cross-section view of the litter box taken along line 1B in FIG. 1A.
Figure 2:
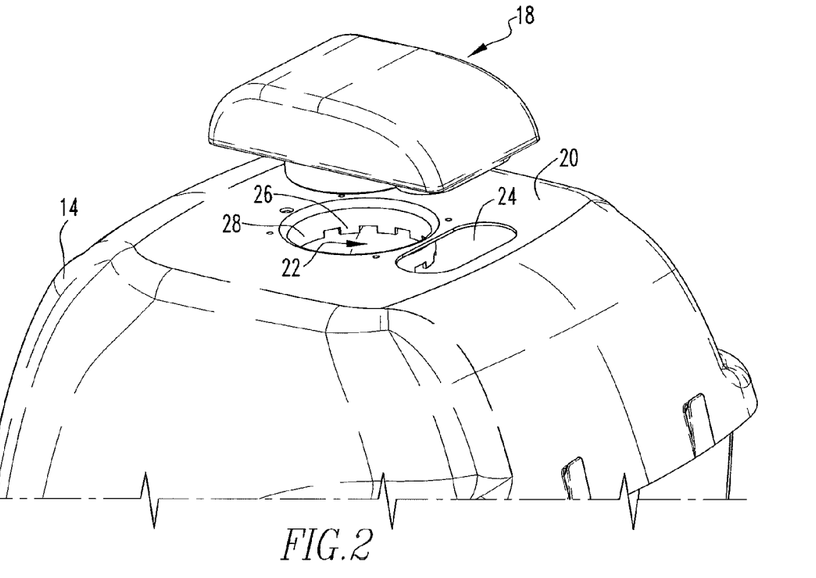
FIG. 2 illustrates an enlarged exploded view of the circulating filter and the litter box.

Referring now to FIGS. 1A-2, the animal litter box housing 10 may include a litter box base 12 and a litter box cover 14. In one embodiment, the litter box base 12 may be provided with side walls that extend upwardly from the litter box base 12, a forwardly inclined front wall with respect to the litter box base 12, a pair of upwardly extending forward wall portions joining the side walls with the front wall, and a pair of inclined angularly disposed rear wall portions joining the side walls with the inclined rear wall. An inverted upper perimeter edge portion is defined by the upper ends of the forward wall portions, side walls, rear wall portions and the rear wall. Additionally, the bottom surface of the housing 10 may include a plurality of pegs, legs, a high-friction coating covering a portion or all of the bottom surface, and/or other supports to support and stabilize the litter box base when it rests on a generally flat surface. Some examples of frictional surfaces include rubber feet, roughened feet, and feet formed from a soft plastic, thermoplastic or suitable resin.

The mating litter box generally corresponds in configuration to the litter box base 12, such that the lower surface of the cover 14 and the upper surface of the base 12 may abut when the two are placed together. The cover 14 may include a top surface 20, sidewalls, a front wall 24, and a rear wall. The cover 14 may also define a lower perimeter lip portion 16 joined to the top surface, sidewalls, front wall and/or rear wall. The lip portion 16 may be adapted to extend over and engage the upper perimeter edge portion of the litter box base 12 when the cover 14 is disposed on the litter box base 12. In the embodiment illustrated in FIGS. 1A and 1B, an opening 21 may be defined at least partially by the front wall 24 of the litter box cover 14 to provide an entrance for an animal into the litter box 10 when the cover 14 is disposed atop the litter box base 12. Alternatively, the animal entrance could be provided in the front wall of the litter box base 12, or partially in the litter box base 12 and partially in the cover 14 so that the opening is defined by both the cover 14 and the base 12.

The cover 14 and/or the litter box base 12 may include a locking mechanism configured to removably secure the cover to the litter box base 12 so as to prevent the cover 14 from becoming disengaged from the base 12 when the litter box housing 10 is moved or picked up, for example. In some embodiments, the perimeter lip portion 16 of the cover 14 may define alignment features that are received by slots defined in the perimeter edge portion of the litter box base 12. Other embodiments may include locking tabs and/or snaps positioned around the perimeter of the litter box base 12 and/or the cover 14. Additionally, in some embodiments, the litter box cover 14 may be hingedly connected to the litter box base 12.

The litter box housing 10 may be made of a polymer or other suitable material. For example, the housing 10 may be formed of a styrene, a polypropylene, a polyvinyl chloride ("PVC"), or a polyethylene terephthalate ("PET"), among other materials.

The top surface 20 of the cover 14 may define a fan opening 22 therein that is adapted to receive a circulating filter 18. As shown in FIG. 2 for example, the fan opening 22 may be positioned toward the rear end of the top surface 20 of the cover 14. In other embodiments, the fan opening 22 may be positioned anywhere along the top surface 20 of the cover 14, including toward the front end of the cover 14, the sidewalls of the cover 14, and/or the middle of the cover 14. In further embodiments, the fan opening 22 may be positioned anywhere along the litter box base 12.

One or more sidewalls 28, as defined by the top surface 20 of the cover 14, may be adjacent to the fan opening 22. The sidewall 28 may include teeth 26, detents or grasping prongs in order to secure the circulating filter 18 onto the cover 14. In these embodiments, the teeth 26 may correspond with portions of the circulating filter 18 that extend into the cavity of the litter box 10, and securing together the circulating filter 18 and the cover 14.

The top surface 20 may also include a vent opening 24 adapted to receive at least a portion of the circulating filter 18. The vent opening 24 may be similarly shaped as the fan opening 22. However, in some embodiments the vent opening 24 may be differently shaped and/or sized. The vent opening 24 may generally be positioned near the rear end of the top surface 20 behind the fan opening 22. In other embodiments, the vent opening 24 may be positioned anywhere along the top surface 20 and/or other areas of the litter box 10. The vent opening 24 and the fan opening 22 provide air flow communication between the circulating filter 18 and the litter box 10. In some embodiments, the vent opening 24 may provide an exit for air leaving the circulating filter 18 and entering back into the litter box 10. The fan opening 22 may provide an entrance for air into the circulating filter 18 from the litter box 10. Thus, air may flow between the circulating filter 18 and the litter box 10.

Figure 3:
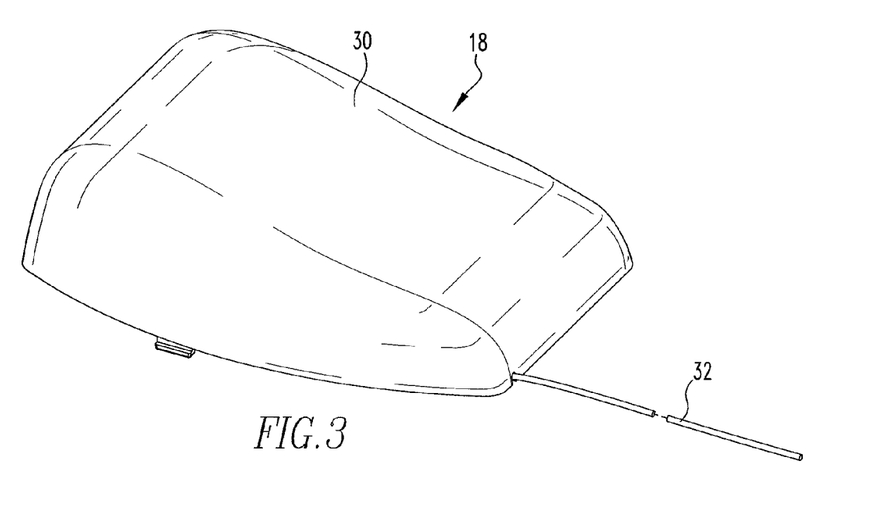
FIG. 3 illustrates a top isometric view of the circulating filter removed from the litter box.
Figure 4:
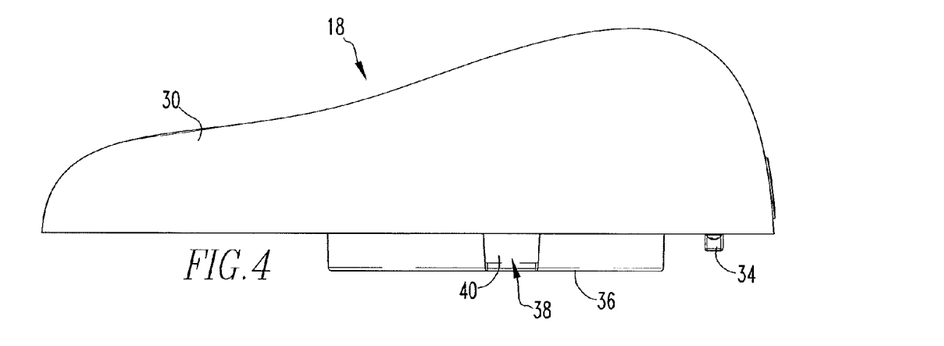
FIG. 4 illustrates a side elevation view of the circulating filter.

FIG. 3 illustrates the circulating filter 18 removed from the litter box 10 and FIG. 4 illustrates a side elevation view of the circulating filter 18. Referring now to FIGS. 2-4, the circulating filter 18 may be configured to circulate air within the litter box 10 and may circulate the air across a filter or series of filters. Additionally or alternatively, in some embodiments, the circulating filter 18 may also circulate air between the outside and inside of the litter box 10. The circulating filter 18 may be inserted at least partially into the fan opening 22 and/or the vent opening 24 defined on the top surface 20 of the litter box 10.

Referring briefly to FIG. 1B, a portion of the circulating filter 18 may be disposed within the inner cavity of the litter box 10, as it may be lower than the top surface 20 of the cover 14. However, in other embodiments, the circulating filter 18 may be substantially flush with the top surface 20 or slightly above the top surface 20 of the cover 14. Additionally, the circulating filter 18 may also be located substantially over the vent opening 24, such that air exiting/entering the circulating filter 18 may be substantially directed into the inner cavity of the litter box 10. The circulating filter 18 may be removed from and refitted to the litter box 10 as desired, thereby allowing a user to remove the circulating filter 18 in order to clean the litter box 10, clean the circulating filter 18 and/or refill the circulating filter 18.

Figure 5:
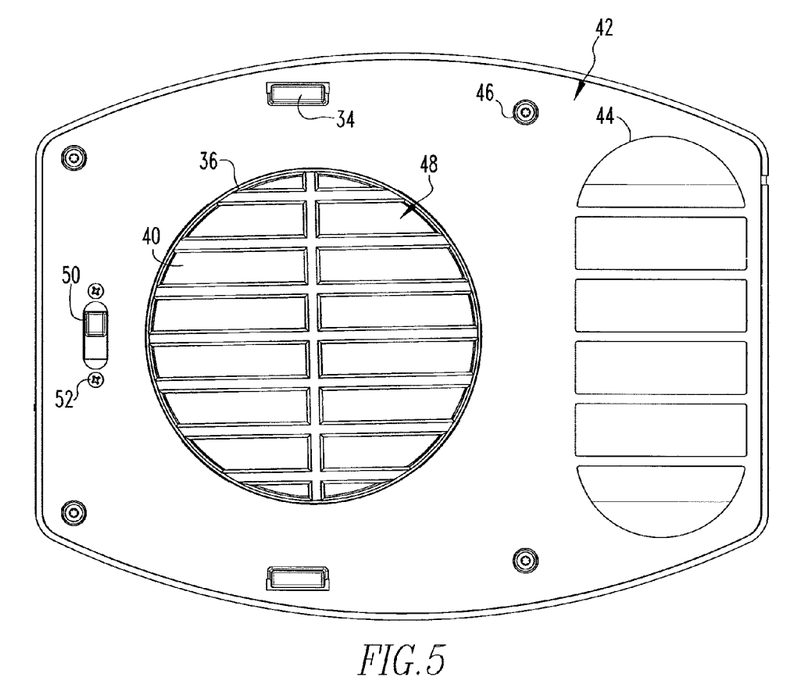
FIG. 5 illustrates a bottom plan view of the circulating filter.
Figure 6:
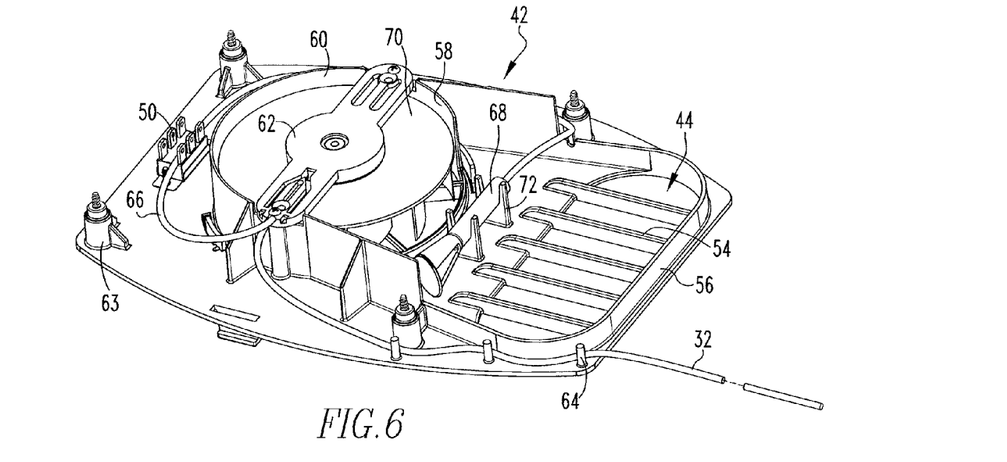
FIG. 6 illustrates a top isometric view of the circulating filter with the top filter housing removed, thereby showing a first embodiment of a second filter.
Figure 7:
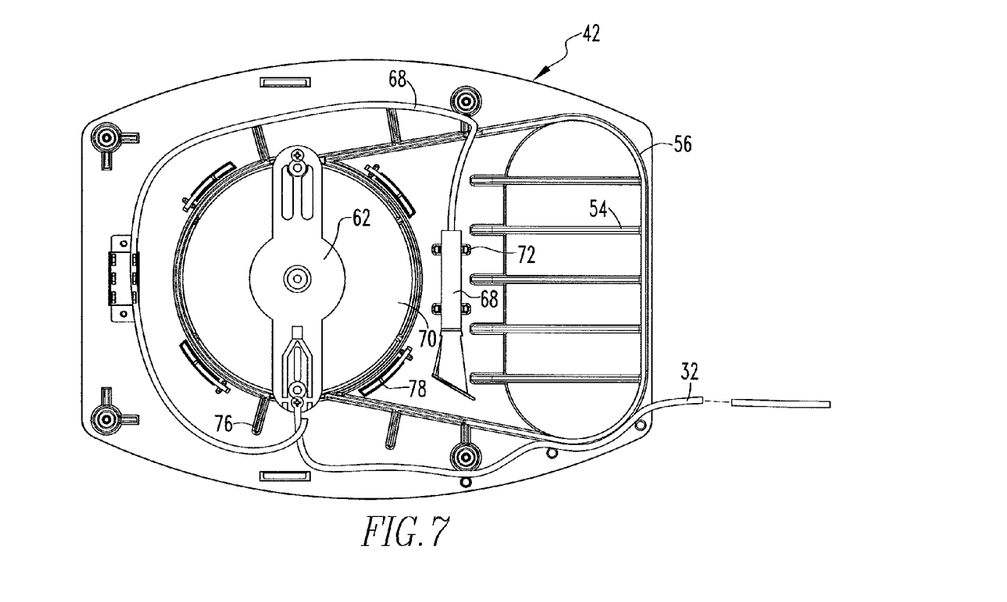
FIG. 7 illustrates a top plan view of the circulating filter with the top filter housing removed.
Figure 8:
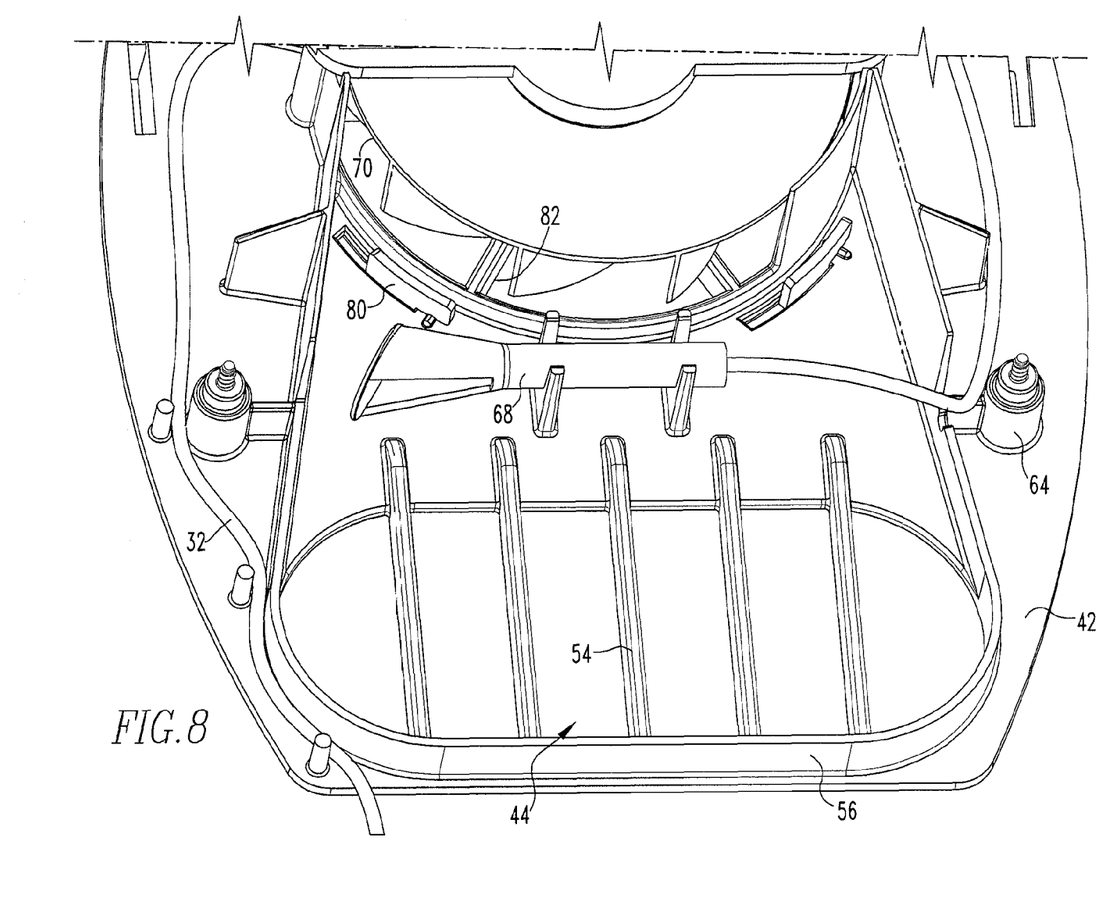
FIG. 8 illustrates an enlarged top isometric view of a front of the circulating filter with the top filter housing removed.

FIG. 5 illustrates a bottom plan view of the circulating filter 18, FIG. 6 illustrates a top isometric view of the circulating filter 18 with the top filter housing 30 removed, FIG. 7 illustrates a top plan view of the circulating filter 18 with the top filter housing 30 removed, and FIG. 8 illustrates an enlarged view of a front portion of the circulating filter 18 as shown in FIG. 6. Referring now to FIGS. 3-8, the circulating filter 18 may pull or otherwise direct air from within the litter box 10 into the circulating filter 18. The air may then be directed through a first filter 38 and then travel into a second filter 68. After being passed through the second filter 68 the air may then be redirected back into the litter box 10, and a substantial portion of odor causing bacteria, dust, and other particles may be removed. These embodiments herein, allow the litter box 10 to smell more appealing to humans and/or animals. Additionally, these embodiments also may remove harmful particles or elements from the air within the litter box 10.

The circulating filter 18 may generally include any or all of the top filter housing 30, a bottom filter housing 42, a power cord 32, a first filter 38, a second filter 68, a fan 70 and a motor housing 62. It should be noted that other components may be added to the circulating filter 18, similarly, and some components may be omitted, depending on the filtering or circulation desired.

The top filter housing 30 may be substantially rectangular shaped and slightly sloped towards a rear portion of the top filter housing 30. In some embodiments, the top filter housing 30 may be configured to mate with or otherwise attach to the bottom filter housing 42. The filter housings 30, 42 may be connected together via fasteners 46, a snap-fit connection, detents or the like. The top filter housing 30 may be used to substantially cover and partially encase the internal components of the circulating filter 18. The bottom filter housing 42 may be used to substantially support the components of the circulating filter 18, as well as secure the circulating filter 18 to the litter box 10. For example, the bottom filter housing 42 may include securing tabs 34, which may be inserted into corresponding apertures (not shown) in the cover 14 when the circulating filter 18 is fitted onto the litter box 10.

Figure 10:
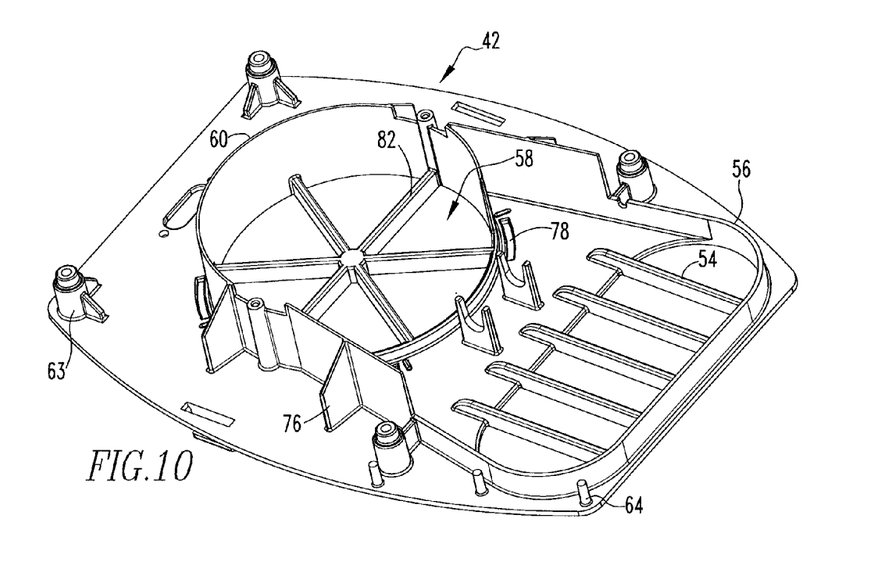
FIG. 10 is a top isometric view of the bottom filter housing of the circulating filter.

Referring now to FIGS. 6 and 10, the bottom filter housing 42 may be molded or otherwise formed to receive and secure a number of components. Additionally, the bottom filter housing 42 may form a substantial portion of the bottom surface of the circulating filter 18 and a portion of the bottom filter housing 42 may be inserted within the fan opening 22 and/or vent opening 24. The bottom filter housing 42 may include a vent apertures 44 located near the front portion of the bottom filter housing 42. The vent apertures 44 may be defined by vent beams 54, and the vent beams 54 may be spaced to vary the size of the vent apertures 44. The vent apertures 44 may be formed in any configuration including, but not limited to, vertical, diagonal slots, horizontal slots, circular apertures and so on. The vent apertures 44 may allow dissemination of filtered air to the interior of the litter box 10, as the vent apertures 44 provide an exit and/or entrance for air from the circulating filter 18 into the litter box 10. In some embodiments, air may exit the circulating filter 18 via the vent apertures 44.

Referring to FIG. 5, when the top filter housing 30 is secured to the bottom filter housing 42, the two housings 30, 42 may be joined such that there may be space between the two, creating a cavity (not shown). In these embodiments, the vent apertures 44 may be covered by the filter housing 30, but not blocked. In other words, the vent apertures 44 may be substantially covered from an outer environment, but may be open to the cavity of the circulating filter 18 and the cavity within the litter box 10. However, in some embodiments, the vent apertures 44 may be partially or substantially open to the outer environment, such that fresh air may be circulated within the litter box 10, as well as the filtered air originally from within the litter box 10.

Turning now to FIG. 6, the bottom filter housing 32 may also include a vent wall 56 substantially tracing the perimeter of the vent apertures 44. The vent wall 56 may connect to a spacer wall 60, which may substantially surround the circumference of the fan 70. The vent wall 56 and/or the spacer wall 60 may substantially protect the fan 70 and vent apertures 44 from being blocked and/or interfered with. Also, in some implementations the walls 56, 60 may also provide support for the top filter housing 30 when it fitted to the bottom filter housing 42. Further, the spacer wall 60 and the vent wall 56 may help direct air flow from the fan 70 through the second filter 68 and/or through the vent apertures 44. The vent wall 56 and/or the spacer wall 60 may include support sidewalls 76 interspersed along locations of the walls 56, 60. The support sidewalls 76 may provide structural support to the walls 56, 60.

Figure 9:
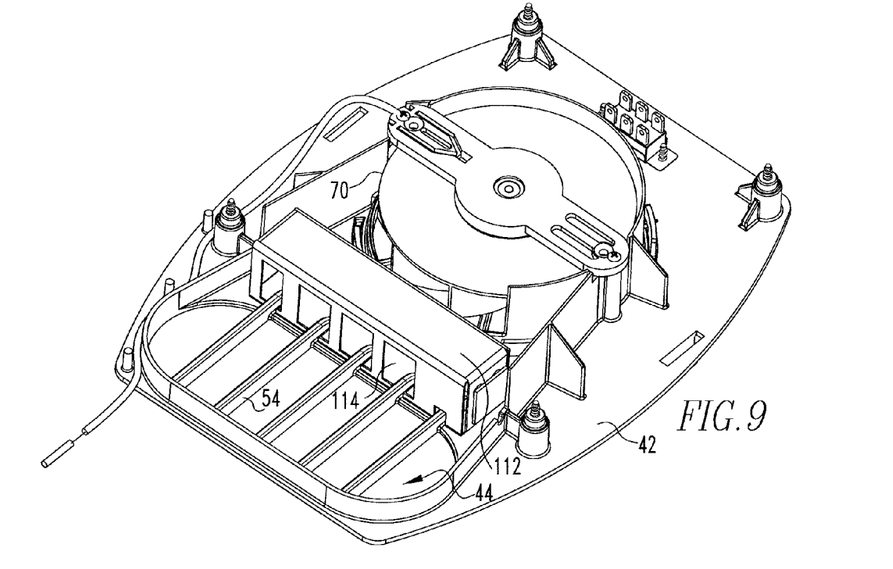
FIG. 9 illustrates a top isometric view of the circulating filter with the top housing removed, illustrating a second embodiment of the second filter.

As shown in FIGS. 8-10, an inner portion of the spacer wall 60 may at least partially define a fan aperture 58. The fan aperture 58 may include fan prongs 82 radiating from a center of the fan aperture 58 to the perimeter of the fan aperture 58. The fan aperture 58 and corresponding fan prongs 82 may be used to separate the first filter 38 from the fan 70, as well as substantially secure the first filter 38 in place. Furthermore, in some embodiments the fan prongs 82 or a portion of fan prongs 82 may extend upwards along the spacer wall 60. In these embodiments, the fan prongs 82 may provide structural support to the spacer wall 60 and also may be used to secure the motor housing 62 to the bottom filter housing 42. For example, the fan prongs 82 may include apertures to receive prongs, tabs, fasteners or the like, connecting the motor housing 62 to the bottom housing 42. The bottom housing 42 may also include securing grill apertures 78. The securing grill apertures 78 may receive securing grill tabs 80, detents or the like, securing the securing grill to the bottom housing 42. In some embodiments, the first filter 38 may be secured between the fan aperture 58 and the securing grill 36.

The bottom filter housing 42 may also include a second filter stand 72. The second filter stand 72 may be used to secure the second filter 68 in place and substantially prevent it from moving. The second filter stand 72 may be shaped to correspond to the shape or a portion of the shape of the second filter 68. The bottom filter housing 42 may also include guiding posts 64. The guiding posts 64 may be positioned anywhere along the bottom filter housing 42 and may be used to guide a cord, for instance the power cord 32 along the top surface of the bottom filter housing 42. As such, the guide posts 64 may be placed anywhere along the bottom filter housing 42 depending on the desired path of any cords or the like. Further, securing columns 63 may be interspersed along the bottom filter housing 42 in order to secure the top filter housing 30 and the bottom filter housing 42 together and/or secure the circulating filter 18 to the litter box 10.

Referring now to FIGS. 6-8 and 11A-12, the fan 70 may be secured to the bottom filter housing 42 via the motor housing 62. The fan 70 pulls air from the inner portion of the litter box 10, forces the air through the first filter 38 as the air is pushed into the circulating filter 18. Then the fan 70 may act to push air through the second filter 68 and back into the litter box 10. The fan 70 may be substantially circular and include blades 74 extending from the center of the fan 70. In some embodiments, the blades 74 may be slightly curved, and each blade 74 may be substantially curved at the same angle. These embodiments may better pull air from the litter box 10 and into the circulating filter 18. However, in other embodiments, the blades 74 may be other shapes. For example, in some embodiments, the fan 70 may be used to disturb and/or circulate the air within the litter box 10 and not be configured to pull air out of the litter box 10. In these implementations, the blades 74 may be differently shaped and/or sized.

Figure 11A:
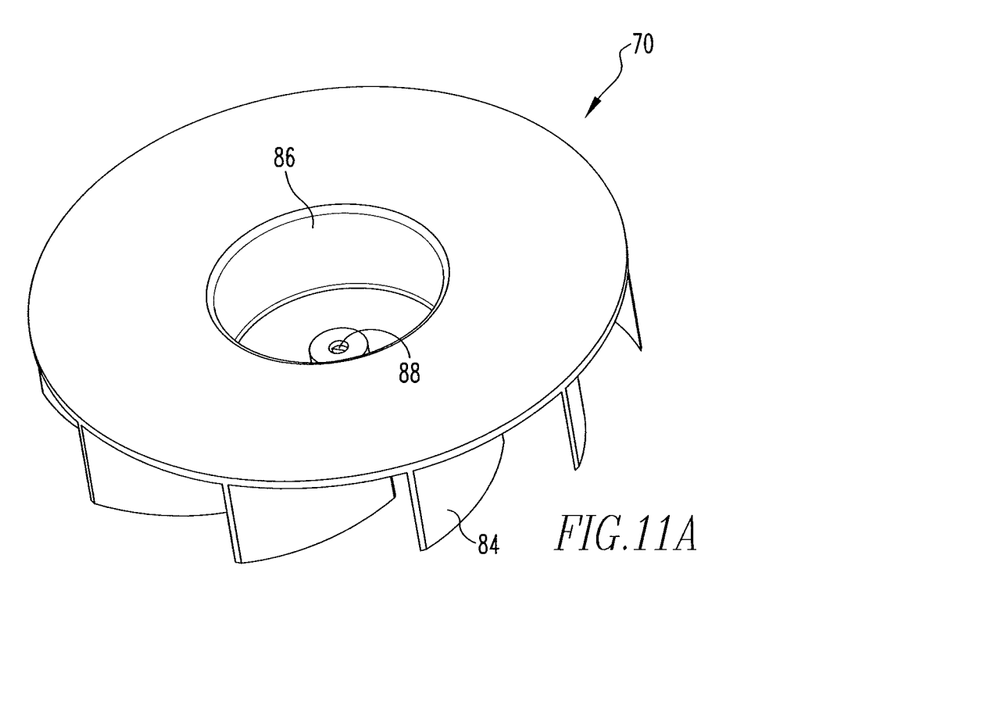
FIG. 11A is a top isometric view of an embodiment of a fan removed from the circulating filter.
Figure 11B:
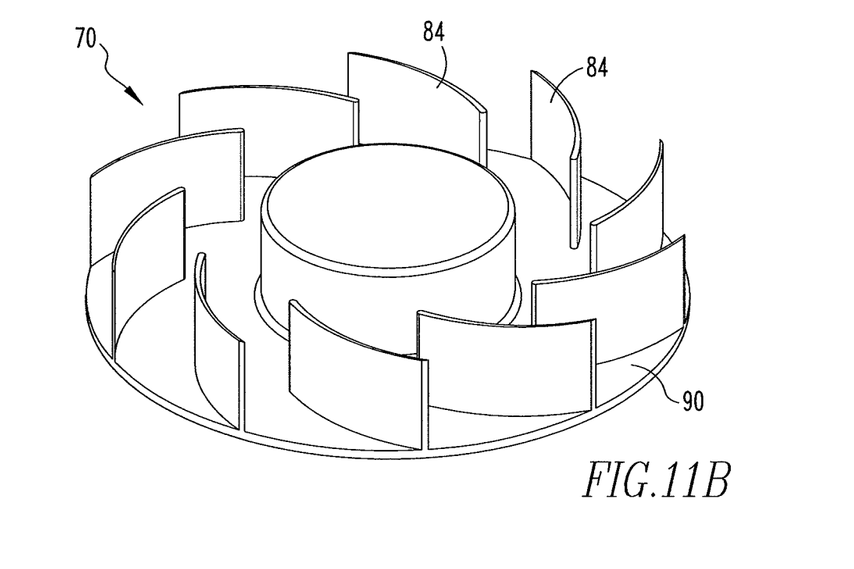
FIG. 11B is a bottom isometric view of the fan illustrated in FIG. 11A.

The fan 70 may also include a motor aperture 86 and motor securing portion 88. The motor aperture 86 in some embodiments may receive a portion of the motor, and the motor securing portion 88 may operably connect the motor to the fan 70, e.g., via a drive shaft. For instance, in some embodiments, the securing portion 88 may be attached to the motor via epoxy, snap-fit, mechanical fastener, and the like. This allows the motor to operate the fan 70 and rotate the fan 70 in a variety for directions, circulating the blades 84. The bottom surface 90 of the motor aperture 86 may sit either flush, higher than or lower than the bottom surface of the blades 84. However, in some embodiments, the bottom surface 90 of the motor aperture 86 may be slightly raised higher than the bottom surface of the blades 84.

Figure 12:
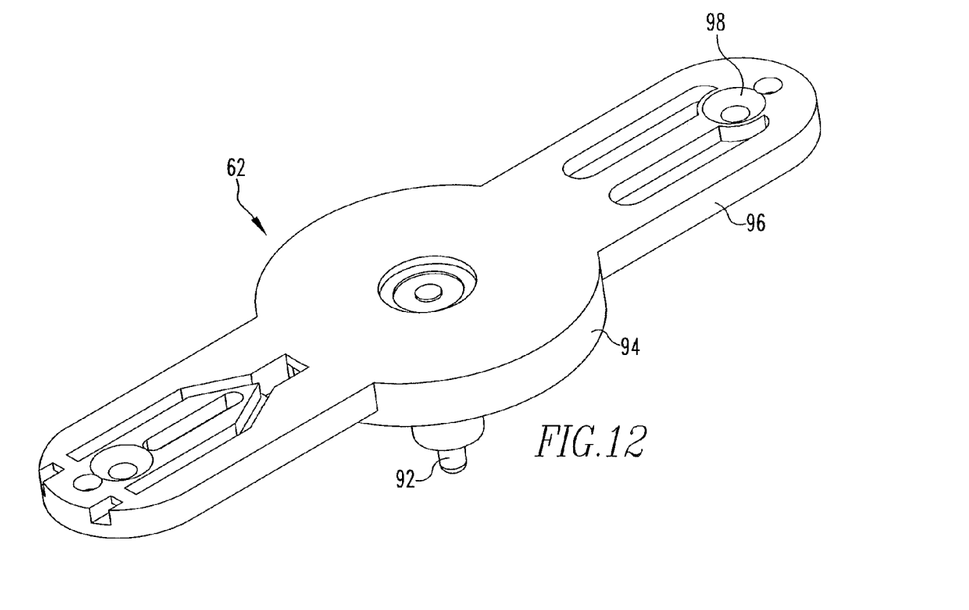
FIG. 12 is a top isometric view of a motor housing removed from the circulating filter.

The motor housing 62 may house a motor (not shown), and include a drive shaft 92 and securing wings 96 (see FIG. 12). The drive shaft 92 may be operably connected to the motor securing portion 88, thus as the drive shaft 92 rotates, the fan 70 may rotate. The drive shaft 92 may extend downwards from the main body 94 of the motor housing 62 and be connected to the motor (not shown). Extending sideways from the main body 94 are securing wings 96. The securing wings 96 may be used to secure the motor housing 62 over the fan 70 as well as secure the motor housing 62 to the spacer wall 60 and/or bottom filter housing 42. For example, in some implementations, the securing wings 96 may include receiving apertures 98 for receiving a fastener and/or electrical connection. Additionally, the securing wings 96 may electrically connect the drive shaft 92 with a power source and/or activation mechanism. In these embodiments, the motor housing 62 may act as a securing belt/portion and substantially secure the fan 70 within the spacer wall 60 and on the bottom filter housing 42.

Figure 13:
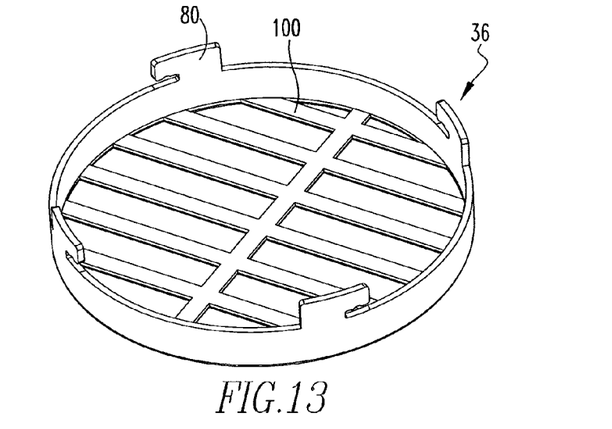
FIG. 13 is a top isometric view of a securing grill removed from the circulating filter.

The bottom surface of the fan 70 may be positioned substantially above the first filter 38. The first filter 38 may be secured below the fan 70 via the securing grill 36. Referring now to FIGS. 5 and 13, the securing grill 36 may be substantially open to allow air to flow through it. The securing grill 36 may be shaped substantially the same as the fan 70 and/or fan aperture 58. The securing grill 36 may include securing grill tabs 80 disposed along its perimeter. The securing grill tabs 80 may be inserted into the bottom filter housing 42 substantially connecting the securing grill 36 to the bottom filter housing 42. In some embodiments the first filter 38 may be disposed between the securing grill 36 and the bottom filter housing 42 and fan 70. The securing grill 36 may include multiple apertures such that air may be pulled via the fan 70 from the litter box 10 into the circulating filer 18. It should be noted that in some embodiments, the securing grill 36 may be integrated with the bottom filter housing 42 and/or omitted.

The first filter 38 may be any type of device that may be used to remove odors from the air and/or clean the air. For instance, in some embodiments, the first filter 38 may be charcoal, carbon, or the like, and the filtering material may be particulates within a container, such as a bag, plate, box and the like, or may be a solid. Additionally, the first filter 38 may be integrated within the securing grill 36 and/or the fan aperture 58. For instance, the securing grill 36 may include filtering material disposed within the securing grill apertures. In other embodiments the first filter 38 may be separate from the circulating filter 18, such that the first filter 38 may be removed to be replaced, cleaned, or the like. In some implementations, the first filter 38 may be substantially shaped the same as the bottom surface of the fan 70 and/or securing grill 36. However, in other embodiments, the first filter 38 may be shaped differently.

Referring now to FIGS. 6-8 and 14A-14B, the circulating filter 18 may include a second filter 68. The second filter 68 may help to remove bacteria, particles, and the like from the air. In some embodiments, the second filter 68 purifies air pulled through the first filter 38 as the air is about to re-enter the litter box 10. In some embodiments, the second filter 68 may include an ultra-violet light assembly, but it should be noted that the second filter 68 may be any other type of filter. For example, in some embodiments, the second filter 68 may be carbon, charcoal or the like, and the filtering material may be particulates within a container, such as a bag, plate, box and the like, or may be a solid.

Figure 14A:
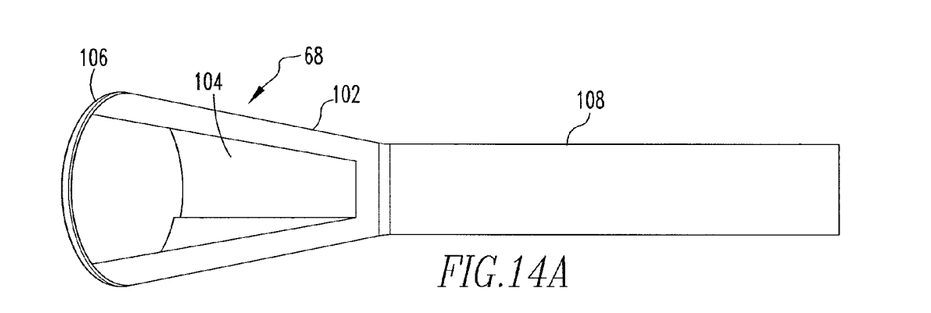
FIG. 14A is a side elevation view of a second filter assembly.
Figure 14B:
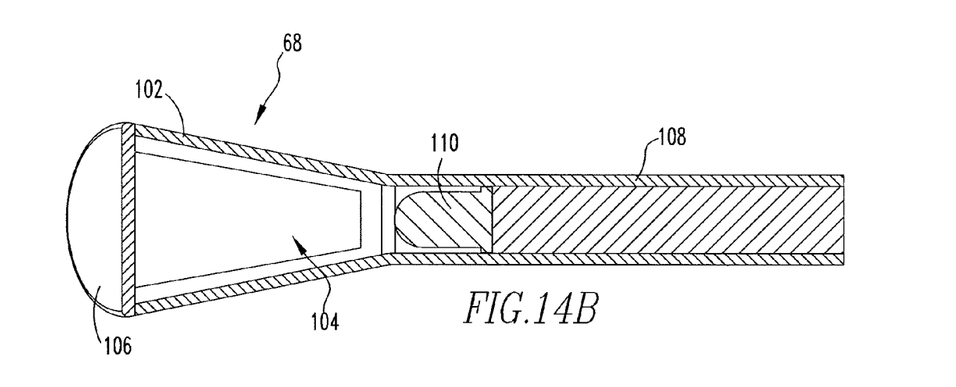
FIG. 14B is a side transparent view of the second filter assembly illustrated in FIG. 14A.

In embodiments where the second filter 68 is an ultra-violet light assembly, the second filter 68 may include a communication cord 68, a main housing 108, an air flow guide 102, and a ultra-violet source 110. As discussed briefly above, the second filter 68 may be supported on the bottom filter housing 42 via the second filter stand 72, and may be substantially cradled within the second filter stand 72. The second filter stand 72 positions the second filter 68 near the exit of the fan 70, thus the second filter 68 may be substantially directly within the air flow path between the fan 70 and the vent apertures 44. These embodiments, help to ensure that most of the air pulled into the circulating filter 18 from the litter box 10 may pass through the second filter 68 before exiting back into the litter box 10.

The optional communication cord 68 extends from a bottom end of the second filter 68 and may be electrically connected to the power cord 32 and/or activation mechanism 50. The communication cord 68 provides power to the ultra-violet source 110 and/or activates the ultra-violet source 110. The main housing 108 may partially encase the ultra-violet source 110 and may substantially protect the ultra-violet source 110 from damage. The ultra-violet source 110 may be a light-emitting diode, a cathode light bulb or any other type of light bulb. Additionally, in some embodiments, the second filter 68 may include another type of light instead of an ultra-violet light. Further, in some embodiments, the ultra-violet source 110 may be battery powered or the like, and the communication cord 68 may be omitted.

The air flow guide 102, in some embodiments, may include a generally conical shaped housing that is narrowest at the rear end near the ultra-violet source 110 and expands outwards towards a front end 106. The flow guide 102 may include flow apertures 104 disposed along the surface of the conical shaped housing. The flow apertures 104 direct air in front of the ultra-violet source 110. In these embodiments, the ultra-violet source 110 may kill bacteria, such as odor causing bacteria, as well as deactivate or kill viruses, and the like, as the air passes through the flow apertures 104. The air enters the flow apertures 104 as the air is pushed from the fan blades 84 into or across the second filter 68. As shown best in FIG. 8, in some embodiments the second filter 68 may be disposed between the vent apertures 44 and an opening in the fan 70. Thus, as the fan 70 spins, air is pulled from the bottom of the fan 70, pushed past the second filter 68 and into the vent apertures 44. As this occurs, air may flow into the flow apertures 104 and pass in front of the ultra-violet source 110 to be sterilized and/or filtered.

FIG. 9 illustrates a second embodiment of the main housing 112. In this embodiment, the main housing 112 may include multiple air flow apertures 114 disposed to substantially correspond with the vent beams 54. Further, air may be substantially directed into each of the air flow apertures 114 as it travels between the fan 70 and the vent apertures 44. In these embodiments, the second filter 68 may include multiple ultra-violet light sources secured within the main housing 112. The ultra-violet light sources (not shown) may open into each of the air flow apertures 114, such that as air passes through each air flow aperture 114 it may be filtered and/or sterilized. For example, in some embodiments, each air flow aperture 114 may direct air in front of four or more ultra-violet light sources.

The circulating filter 18 may also include the power cord 32 and the activation mechanism 50. The power cord 32 may be used to supply portions and/or components of the circulating filter 18 with electricity or other power means. For example, the power cord 32 may provide power to the motor, drive shaft 92 and/or the second filter 68. In some embodiments, the power cord 32 may exit the top filter housing 30, for example, if the circulating filter 30 includes a wired power source. However, in other embodiments, the power cord 32 may remain substantially within the top filter housing 30; for example, if the circulating filter 18 is powered via batteries or the like. In some embodiments, the power cord 32 may connect the circulating filter 18 to a power source. For instance, the power cord 32 may include a plug connecting the circulating filter 18 to an outlet such as alternating or direct current outlet and/or battery source.

The activation mechanism 50 may be located on the bottom filter housing 42, or on the top filter housing 30. In some embodiments, the activation mechanism 50 may automatically activate the fan 70 and/or second filter 68. In other embodiments, the activation mechanism 50 may manually activate the fan 70 and/or second filter 68, or in further embodiments, the activation mechanism 50 activate the fan and/or second filter 68 manually and automatically. In some embodiments, the activation mechanism 50 may be a switch and in other embodiments, the activation mechanism 50 may be a sensor or the like.

In embodiments where the activation mechanism 50 is a switch, the switch may alternate between a first state and a second state. The user may slide the switch from the first state to the second state, depress a button, pull a lever or the like. When in the first state the circulating filter 18 may be in the "off" position, i.e., the fan 70 and the second filter 68 may be deactivated. However, when the switch is in the second state, the fan 70 may begin to rotate and the second filter 68 may be activated. Additionally, in some embodiments, the switch may include other states, for example, a fan 70 only state, a second filter 68 only state, a fan 70 speed state or the like.

In embodiments employing a sensor, the sensor is typically located on a portion of the circulating filter 18 that extends into the internal cavity of the litter box 10, such that the sensor can sense movement, heat, light or the like or other changes in the litter box 10 in order to detect whether an animal has entered/exited the litter box 10. The sensor may be an infrared sensor, radio frequency sensor, or the like, as some examples.

In some embodiments, the sensor determines whether an animal is present in the litter box 10 and/or when the animal exits the litter box 10. After the animal exits the litter box 10, the sensor may activate the drive shaft 92 and/or the second filter 68. In other embodiments, the circulating filter 18 may be activated via user input. For example, the activation mechanism 50 may include control buttons, switches or the like to activate the drive shaft 92 and/or the second filter 68. These controls may be used in replace of or in addition to the sensor. In these embodiments, in response to user input the drive shaft 92 may rotate the fan 70 and activate the ultra-violet source 110. In some embodiments the control buttons may also be used to stop fan 70 from rotating, change the speed of rotation for the fan 70, turn off the second filter 68, change the beam power of the second filter 68, or the like.

The drive shaft 92 rotates the fan 70, pulling air from the litter box 10 through the first filter 38. Then, as air exits the top portion of the fan 70, it enters the second filter 68 and passes through light emitted by the ultra-violet source 110. After exiting the second filter 68, air then passes through the vent apertures 44 and back into the litter box 10. The time and/or the amount and number of rotations by the fan 70 may be set to any desired length, thus varying air circulation. It should be noted, that in some embodiments the sensor may not be located on the circulating filter 18, but on or within the litter box 10 and be in communication with the drive shaft 92 and/or second filter 68.

In other embodiments, the litter box 10 may also include another electrical device, such as an external or internal light, raking device for the bottom of the litter pan, or the like, in addition to or in replace of the circulating filter 18. The electrical device may be coupled to a power source, such as a battery, a solar cell, any AC or DC power source, and so on and so forth. In some examples, the electrical device may be a light, fan, or any other electrical device. The device may be located inside the litter box housing 10 or outside the litter box housing 10. As one example, pressing on the filter housing may activate the associated electrical device. As another example, a separate switch on the litter box may activate a device located within the filter housing and/or filter itself. In additional embodiments, the switch may be activated via a motion sensor, for example, that senses when an animal is approaching or has entered the litter box.

Forming the circulating filter 18 as a separate piece from the litter box cover 14 may reduce manufacturing complexity and/or costs, as compared to manufacturing a litter box 10 including an integral filter. For example, the circulating filter 18 and the litter box 10 may be manufactured in a two or three-step molding process. Generally, the litter box 10 is manufactured in a one or two-step molding process and the circulating filter 18 is separately manufactured. Since the circulating filter 18 may be fully detachable from the litter box cover 14, manufacturing of an additional hinge, tab, or other component for attaching the circulating filter 18 to the litter box may not be required. Additionally, the disclosed embodiments may further reduce the error associated with forming attachment mechanisms and/or cover plates, as these pieces often require precise manufacturing techniques.

Various changes and modifications may be made in carrying out the embodiments disclosed herein. Insofar as these changes and modifications are within the purview of the appended claims, they are to be considered as part of the disclosed embodiments. In this regard, it is to be understood that the particular configurations of the litter box cover and box are disclosed herein merely as examples of cover and litter box configurations which can be employed with the circulating filter. Additionally, the embodiments disclosed herein include housing including separable litter box cover and litter box components, however, in other embodiments, the litter box housing may include a single container. Other litter box cover and box configurations could be employed.

What is claimed is:

1. A litter box for use by an animal and comprising:
   a base portion comprising a floor and one or more walls extending from the floor;
   a cover portion comprising a ceiling and one or more walls extending from the ceiling;
   the cover portion being structured to be engaged with the base portion, the cover and base portions further being structured to have an interior region situated between the base and cover portions when engaged; and
   a circulating filter apparatus having:
      a filter entrance in direct fluid communication with the interior region,
      a filter exit in direct fluid communication with the interior region,
      a filtration system in fluid communication with at least one of the filter entrance and the filter exit, and
      a fan structured to circulate at least a portion of the air from the interior region into the filter entrance and from the filter exit into the interior region.

2. The litter box of claim 1 wherein the filtration system comprises a pair of elements each being in fluid communication with at least one of the filter entrance and the filter exit, one of the elements comprising a filtering material, and the other of the elements comprising a light source.

3. The litter box of claim 2 wherein the light source is at least a first ultraviolet light source.

4. The litter box of claim 2 wherein the light source is a plurality of ultraviolet light sources.

5. The litter box of claim 2 wherein the circulating filter apparatus comprises a control that is structured to change the beam power of the light source.

6. The litter box of claim 2 wherein the circulating filter apparatus comprises a control which, upon initiating operation of the circulating filter apparatus, is structured to turn OFF at least one of the fan and the light source.

7. The litter box of claim 2 wherein the light source is situated substantially directly in a flow path of air between the filter entrance and the filter exit.

8. The litter box of claim 7 wherein the light source is situated substantially directly in the flow path of air between the fan and the filter exit.

9. The litter box of claim 7 wherein the filtering material is situated substantially directly in the flow path of air between the filter entrance and the filter exit.

10. The litter box of claim 9 wherein the light source is situated in the flow path of air downstream of the filtering material.

11. The litter box of claim 10 wherein the fan is situated in the flow path of air downstream of the filtering material.

12. The litter box of claim 1 wherein the circulating filter apparatus is situated on the cover portion.

* * * * *